United States Patent [19]

Mattei

[11] Patent Number: 4,581,988

[45] Date of Patent: Apr. 15, 1986

[54] PROTECTIVE DEVICE FOR WORK IN POLLUTED ENVIRONMENT

[76] Inventor: Eliane Mattei, 11 Bis rue Chevalier, 94210 La Varenne St. Hilaire, France

[21] Appl. No.: 586,015

[22] Filed: Mar. 5, 1984

[30] Foreign Application Priority Data

Mar. 4, 1983 [FR] France .................. 83 03582

[51] Int. Cl.$^4$ ............................................. B60H 3/06
[52] U.S. Cl. ......................................... 98/1.5; 98/2.01; 98/2.11
[58] Field of Search .................. 98/1.5, 2.01, 2.11; 165/15

[56] References Cited

U.S. PATENT DOCUMENTS

| | | | |
|---|---|---|---|
| 3,657,992 | 4/1972 | Minnick, Jr. ........................ | 98/2.11 |
| 4,007,875 | 2/1977 | Stolz et al. ......................... | 98/2.11 |
| 4,467,706 | 8/1984 | Batcheller et al. ................ | 98/2.01 X |
| 4,478,049 | 10/1984 | Fukui et al. ........................ | 98/2.01 X |

FOREIGN PATENT DOCUMENTS

| | | | |
|---|---|---|---|
| 2648572 | 5/1978 | Fed. Rep. of Germany ....... | 98/2.11 |
| 147649 | 4/1981 | German Democratic Rep. ............................ | 98/2.11 |
| 57-107911 | 7/1982 | Japan .................................. | 98/2.11 |
| 57-139233 | 8/1982 | Japan .................................. | 98/2.11 |
| 306319 | 8/1971 | U.S.S.R. ............................. | 98/2.11 |
| 740541 | 6/1980 | U.S.S.R. ............................. | 98/2.11 |

*Primary Examiner*—Harold Joyce
*Attorney, Agent, or Firm*—Steele, Gould & Fried

[57] ABSTRACT

A device for protecting the operator of mobile plant working in a polluted environment comprises an air treatment unit adapted to be fitted to or incorporated into a roof of a cab accommodating the operator. The air treatment unit contains at least one coarse filter element, a fine filter element and a chemical filter element. It further contains a motor-driven fan on the outlet side of the filter elements, a pressure monitoring device and a toxicity monitoring system. The toxicity monitoring system comprises at least one semiconductor sensor, a voltage selector and a display panel connected to the sensor(s) and to the voltage selector.

8 Claims, 7 Drawing Figures

PROTECTIVE DEVICE FOR WORK IN POLLUTED ENVIRONMENT

BACKGROUND OF THE INVENTION

1. Field of the Invention

The invention concerns a protective device, in particular for work cabs in a polluted atmosphere.

The invention is more particularly concerned with the vital protection of personnel against solid, liquid and gaseous products used in agriculture, especially soil and crop treatment products.

2. Description of the Prior Art

The state of the art is defined by certain types of apparatus which are more often than not fitted to the roof of a vehicle cab, the roof of an agricultural tractor cab, for example.

At present, apparatus of this kind consists of an enclosure having an air inlet externally of the cab leading to a motor-driven fan providing a pulsed air feed into the enclosure in which the air is passed through a dust filter followed, in certain installations, by an activated charcoal filter to absorb noxious gases, following which the filtered air is fed into the cab of the vehicle.

In this type of apparatus the motor-driven fan is mounted on one of the external walls of the enclosure and draws in air from the outside via an opening whose inlet surface area is substantially the same as the active working area of the blades of the fan, which gives rise to problems if any attempt is made to pressurize the cab fitted with this type of apparatus. It has been established that an air flowrate of approximately 900 m$^3$/h was essential if a particular tractor cab was to be properly pressurized, whereas the air pressure after filtration was no more than approximately 210 m$^3$/h, by virtue of head losses. If a flowrate of this magnitude is not achieved, a certain quantity of dust and polluting agents remains in the cab and the safety of the occupant is not assured.

Another problem with this type of known apparatus is the rapid clogging of the filter elements, and above all their rapid neutralization when the vehicle works in an atmosphere laden with liquid particles (as in spraying aqueous solutions), in which case the surrounding mist resulting from such spraying is drawn in by the motor-driven fan and directed pulse fashion onto the mechanical filter through which it passes, still laden with moisture and toxic products, to reach the chemical filter . which very soon loses its adsorbent capacity, once it is impregnated with moisture.

A final known problem is the ease with which the airflow can circumvent the filters by passing through the interstices between the filters and surrounding structures.

A consequent objective of the present invention is to overcome these problems by providing an air pressurization and purification device which features a more efficient pressurization function such as to prevent any penetration of polluted air into the cab.

Another objective of the invention is to provide a device implementing more efficient purification and whose effective service life is enhanced on the one hand by delaying clogging of the filter elements and on the other hand by eliminating, after filtering, the majority of the liquid particles which may be contained in the outside atmosphere, and finally by forcing the air drawn in from outside through filters and a cell.

A further objective is to provide a device of this kind with combined monitoring means providing a continuous indication of the effectiveness of the pressurizer/air conditioner fitted to the working or driving cab. The pressurizing devices are equipped with an inlet filter, at least one physical filter, in some instances a chemical filter and a variable flowrate turbofan which provides a pulsed air feed to the operating cab.

It has been found that the efficiency of filtration in devices of this kind is dependent on numerous factors, two of which are essential. These two factors are, on the one hand, the relative pressure difference between the environments inside and outside the cab, and, on the other hand, the condition of the filters (inlet filter, physical filter and chemical filter). There is a high concentration of noxious products (sprays, powders) in the outside environment, and the inside environment is that which is to be protected. This pressure difference is achieved by pressurizing the cab using the motor-driven fan in the device. The pressure difference may be low, of the order of a few millimeters of head of water. This slightly increased pressure constitutes a barrier to the entry of noxious products into the cab. The efficiency of filtration is affected by three phenomena:

Clogging of the physical filters: the principal function of the inlet filter and the physical filter is to physically retain particles in suspension in the air. These particles are the primary support for noxious products and vapors. It is therefore understandable that in fulfilling their function these filters will become charged with particles and will progressively become clogged. Clogging results in another effect, the phenomenon of desorption; the filters, overloaded with particles, begin to release them and these particles reach the interior of the cab. The efficiency of filtration is then zero.

Saturation of the chemical filter: the chemical filter, consisting of activated charcoal and a support, has the property of retaining the organic constituents of noxious aerosols and vapors by virtue of the phenomenon of absorption. Nevertheless, the retention capacity (in terms of molecular weight) of these chemical agents is limited and proportional to the weight of activated charcoal. The (non-limiting) retention capacity of the current cell is between 260 and 350 grams. Beyond this figure, its capacity falls rapidly and there is virtually no chemical filtration. Also, under these conditions, the cell is subject to the phenomenon of desorption.

Thus in the cases of devices of the kind in question, it is important to know at all times the condition of the chemical filter, the state of the mechanical filter(s) and the air flowrate, which must be adjusted to the minimum compatible with maintaining pressurization in the cab to economize on the filters, according to the filtration capacity of the filters.

The kind of protective device for working in a polluted atmosphere with which the invention is concerned is particularly designed for the driving cabs of agricultural tractors and comprises an air treatment unit mounted on or incorporated into the roof of the cab, equipped internally with at least one coarse filter unit for eliminating solids such as leaves and grit, a composite fine filter element for removing dust and formed by a stack of several materials of different nature facilitating the capture of dust particles, and an activated charcoal cell for removing noxious gases and vapors by adsorption and, finally, a turbofan for drawing in air from the outside and feeding it, filtered and purified, into the cab. Leaks on the air path are eliminated and filtration is rendered highly efficient by the arrangement proposed by the present patent. The filter and the cell are pressed onto an intermediate metal frame, the filter mounted on the inlet side being pressed naturally onto this frame by the reduced pressure, the cell being retained firmly by means of stays, for example, preventing its removal by virtue of the reduced pressure, the filter and the cell comprising a seal on the active surface. Given these conditions, it is merely necessary to provide a seal around the intermediate metal frame.

A device of this kind is disclosed in United Kingdom Pat. No. 82 29027. According to this patent, there are provided, in addition to pressurization monitoring means, toxicity detectors consisting of several pellets of reagent having the facility for changing color above a certain threshold of presence of pollutant chemical substances in the cab. Each pellet corresponds to a particular product routinely used in agriculture. Unfortunately, the reaction of the pellets to pollution is relatively slow, as a result of which these detectors are not able to indicate quickly a sudden rise in the toxicity concentration.

A first object of the present invention is a protective device equipped with electronic detection means which respond instantaneously to a change in the internal atmosphere of the cab. Moreover, the detectors are regenerated automatically, unlike the pellets, eliminating an ancillary task.

The device according to the aforementioned patent, although of good reliability, has nevertheless met with a certain amount of reluctance among users little aware of the dangers to which they are exposed when spreading products dangerous to their health. Apart from sometimes severe feelings of claustrophobia, some users complain of excessive cold or heat when atmospheric conditions are severe, in particular due to the fact that tractor cabs feature large glazed areas.

A second object of the present invention is to provide effective air conditioning irrespective of atmospheric conditions so that the driver may remain enclosed without suffering as a result of the inclemencies of the weather.

Also, in the aforementioned patent, the air is drawn in from outside and treated continuously. Pressurization is indispensible only when spreading dangerous products. The present invention provides for defining two sets of operating conditions of the protective device. The so-called "comfortable" operating conditions apply when carrying out transportation or other tasks which are not dangerous, and involve recycling the air in the cab, sparing the filters. The so-called "safe" operating conditions involve drawing in air from the outside and treating it, creating an increased pressure inside the cab. This pressurization is not obtained under the "comfortable" operating conditions since the cab is not sealed.

Furthermore, with a view to further enhancing the safety of the driver, the invention provides for distributing the filtered air by means of a special diffuser so that it forms an air curtain isolating the driver from the total volume of the cab under dynamic conditions.

SUMMARY OF THE INVENTION

The invention consists in a device for protecting the operator of a mobile plant working in a polluted environment, comprising an air treatment unit adapted to be fitted to or incorporated into a roof of a cab accommodating said operator, said air treatment unit containing at least one coarse filter element, a fine filter element, a chemical filter element, a motordriven fan on the outlet side of said filter elements, a pressure monitoring device, and a toxicity monitoring system comprising at least one semiconductor sensor, a voltage selector and a display panel connected to said at least one sensor and to said voltage selector.

The semiconductor sensor is disposed inside the cab. It consists of a diode, including a regenerator heating resistor, immersion of which in a polluted medium causes a variation in impedance by physicochemical reaction, the amplitude of this variation varying according to the nature of the pollutant agent or toxic product adsorbed and with the concentration of toxic material in the surrounding medium. It is known that with the commonest agricultural products the toxicity limit which must not be exceeded varies from approximately 50 to 400 $\mu$g per m$^3$. It is therefore necessary to modulate the information received by means of a parameter which is dependent on the rate of adsorption of the product being spread at a given moment. It is the function of an appropriately calibrated multiplexer to confer on the display a response which is dependent on the material being spread.

In accordance with another feature of the present invention, the enclosure containing the filter elements also contains the condenser of an air conditioner of which the compressor is driven by the motor of the vehicle to which the cab is fitted. Also, the enclosure further contains a radiator connected to the heating circuit of the vehicle. In this way there is achieved efficient air conditioning which, in view of the large volumes of air to be treated, cannot be achieved by automobile air conditioners. It would also be possible to provide air conditioning by temporary conversion of the evaporator into a condenser, but this would require the provision of multiple-channel cycle reversing valves for the freon which is the usual working fluid in this type of installation.

In accordance with a further feature of the invention, the sealed enclosure containing the filter elements is provided at the front with a set of pivoted slats operated by a piston-and-cylinder device or solenoid and enabling the interior of the enclosure to be isolated from the exterior, a second piston-and-cylinder device or solenoid opening a recycling conduit when said slats are closed. These control devices provide for manual or automatic changeover from the "comfortable" position to the "safe" position, according to set points and indications provided by the concentration and pressurization sensors.

Other objects and advantages will appear from the following description of an example of the invention, when considered in connection with the accompanying drawings, and the novel features will be particularly pointed out in the appended claims.

DESCRIPTION OF THE PREFERRED EMBODIMENTS

Figure 1:
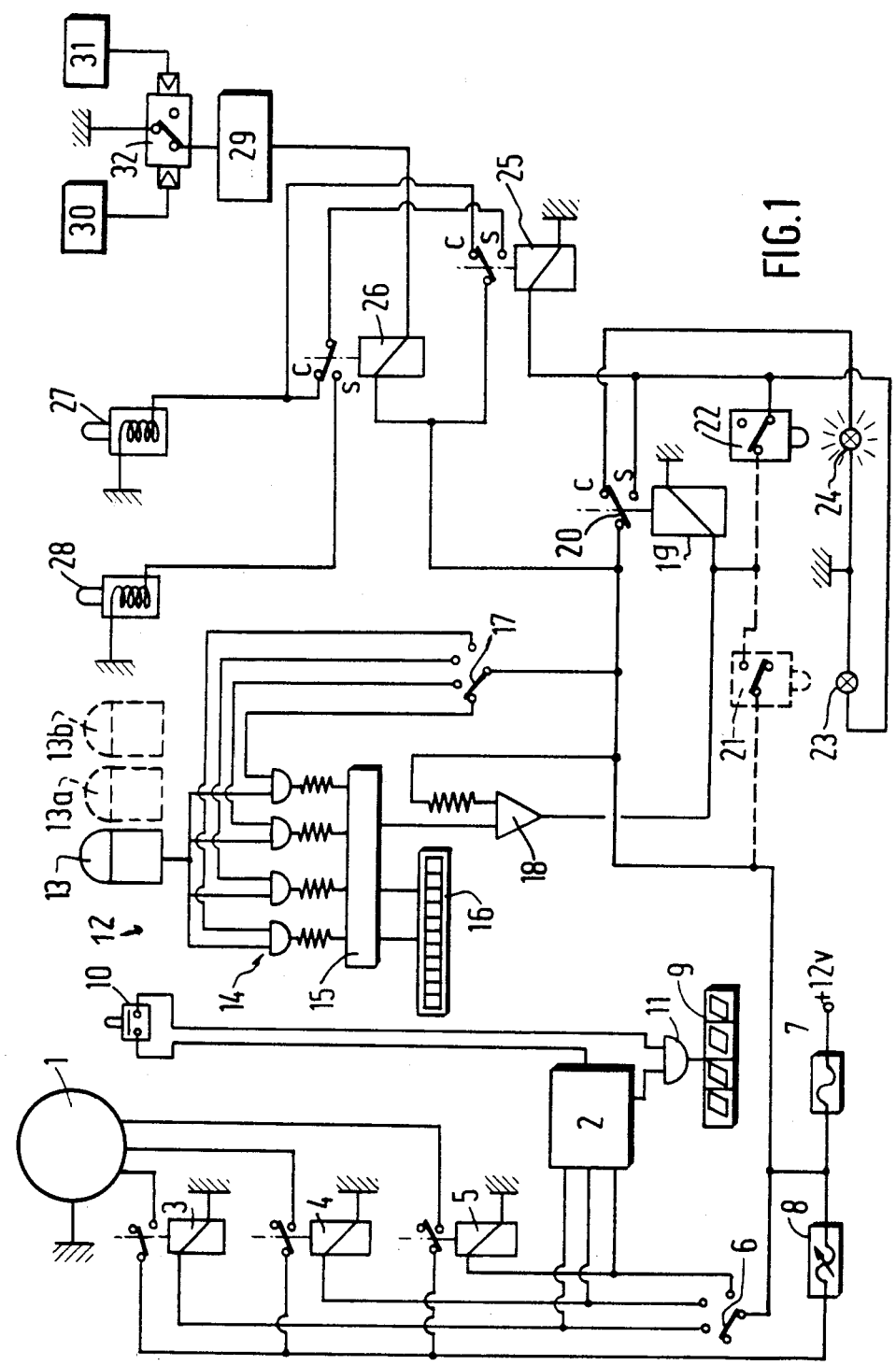
FIG. 1 is an electrical circuit diagram of the device (automatic monitoring version).

FIG. 1 is an electronic circuit diagram of the control circuit of the device providing for either manual or automatic operation of the latter. There are seen in it, from left to right, the motor-driven fan 1 or rather its motor connected to one pole 7 of the battery of the vehicle by a set of three circuits the closing of which is controlled by relays 3, 4 and 5. These circuits include resistors (not shown) of different values, which provides for the application to the input terminal of the motor 1 of different voltages and consequently for driving the latter at different speeds, the motor being also connected to ground. The aspiration speed selected thus depends on the position of the switch 6 which is accessible to the driver who carries out the necessary adjustments. The applied voltage may also be adjusted, if required, using a rheostat 8. A "volumeter" 2 is branch-connected to the preceding circuits and is connected through one input of an "AND" gate 11 to a display 9, of the kind employing diodes, for example. To a second input of the gate 11 is connected a switch 10 indicating presence or absence of the filter cell. Thus the volumeter functions only when a filter cell is in position. In practice, the volumeter is a meter indicating the electrical power consumed, but since this consumption is proportional to the rotation speed of the motor-driven fan, and thus to the air actually aspirated, it gives a measure of the cumulative flow of air into the cab. The following stage constitutes the "toxicity meter", generally referenced 12. It comprises at least one sensor 13 connected by a set of gates 14 to a processing circuit 15, of which at least one output is connected to a diode type display 16. The gates 14 are selected by a switch 17, the combination being fed from the voltage source 7. The sensor 13 essentially consists of a semiconductor diode incorporating a heater resistor. It is disposed inside the cab. The optional presence of the sensors 13a and 13b represented in dashed line will be explained hereinafter. The upper surface of the diode is exposed to the air in the cab so that it can adsorb ions resulting from the presence of specific toxic substances. As has been stated hereinabove, the rate of adsorption of these ions depends on the nature of the product to be detected. Consequently, it is necessary to calibrate the circuits according to the nature of the products, and this is the function of the resistors included in the output circuits of the gates 14. In this way, the signals from the sensor 13 reach the processing stage at a common level. The selector 17 is thus set to a position which corresponds to a given type of product before spreading is begun.

To the output of the processing circuit 15 there is also connected a power amplifier 18 the output of which is connected to the control terminal of a relay 19 controlling the position of a switch 20. This switch automatically sets the device to the "comfortable" position or to the "safe" position. The figure shows an automatic device. In another, so-called manual, version the relay 20 is controlled by two manual switches 21 and 22 selecting respective positions. In this case, the voltage generator 18 is eliminated. These switches and their connections are shown in dashed line in FIG. 1. In another version, the two self-latching switches 21 and 22 may be replaced by a single two-position selector switch.

The position of the switch 20 controls a set of functions providing for actuation of the electromechanical units of the device. The lamps 23 and 24 on the control panel inside the cab indicate the device operating conditions at all times. These lamps are connected in parallel with the relays 25 and 26 which control the "comfortable" and "safe" solenoids 27 and 28, respectively.

In FIG. 1, the position of each relay and switch corresponds to the "comfortable" operating conditions; that is, the relay 27 is armed whereas the relays 25, 26 and solenoid 28 are unoperated. On operation under "safe" operating conditions, the differential pressure switch 29, 30, 31 and 32 energizes the solenoid 26 only if the outside pressure is higher than the inside pressure. As soon as the inside pressure becomes higher than the outside pressure the pressure switch ceases to energize the relay 26 and the "safe" solenoid is no longer energized; the exterior slats close automatically, the solenoid 27 is actuated and the device operates in "recycling" mode, sparing the cell and enhancing the performance of the air conditioner.

The pressure switch comprises an outside pressure intake 30, an inside pressure intake 31 and a comparator 29. As already stated, the overpressure to be maintained in the cab is of the order of a few millimeters of head of water. The time-delay 29 prevents hunting of the system by maintaining aspiration of air from the outside for a certain time interval after the required pressure difference is achieved. Under "comfortable" operating conditions the air is automatically renewed by opening the slats 33 and closing the trap 41 periodically, every 15 minutes, for example.

Figure 2:
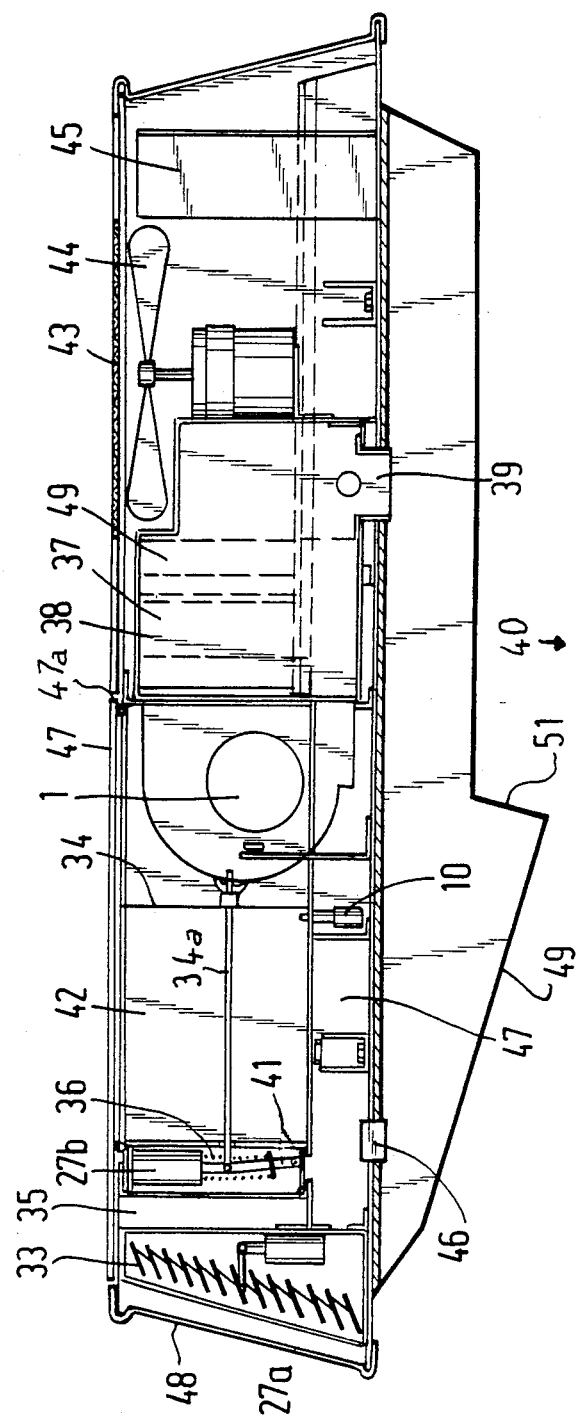
FIG. 2 is a view in cross-section through the enclosure and the roof of the cab of the vehicle.

FIG. 2 shows the enclosure which is either integrated into the roof of the cab of the vehicle or attached above the latter, the side panel assembly having been removed. The open side is closed off by a grille 48 which effects coarse filtering of large items such as twigs. Behind this grille are disposed slats 33 mounted to pivot around horizontal axes operated by a piston-and-cylinder device 27a in turn controlled by the relay 27 (FIG. 1). Behind the slats 33 are the physical filter 35 followed by a chamber 36 in which is disposed a second piston-and-cylinder device 27b the function of which is to open or close a trap 41 establishing communication between the interior of the cab and the chamber 36. This arrangement provides for filtration of the recycled air by the cell 34. Opposite the physical filter relative to the chamber 36 there is disposed, inside a totally sealed frame, the chemical filter 34 which is rigidly attached to the frame inside the chamber 36 by two stays 34a. It is essential that no leaks to the exterior of the filter 34 occur as toxic products could then penetrate to the interior of the cab without passing through the filters. Behind the chemical filter is disposed a turbofan 1 which is driven in rotation as described with reference to FIG. 1. This figure again shows the switch 10 shown in FIG. 1 and indicating presence of the filter cell. The outlet of the motor-driven or turbofan 1 discharges into a chamber 38 which contains a radiator element 49 connected to the cooling circuit of the motor of the vehicle and an evaporator 37 which forms part of the circuit of an air conditioner of which the other components will be described subsequently. The chamber 38 discharges into the cab 40 through at least one pipe 39. The enclosure therefore contains the physical filtration means 35 and chemical filtration means 34, the latter filter advantageously consisting of activated charcoal. Externally of the sealed enclosure, but constituting part of the device, are a fan 44 and a heat exchanger or condenser 45 which, like the evaporator 37, form part of the circuit of an air conditioner of which the compressor is driven by the motor of the vehicle and is located in the lower part of the chassis (not shown). The freon circuit is connected by means of two automatic connectors (not shown) which frees the user of any need to manipulate this delicate product. The filtered air can therefore be either heated by the radiator 49 or cooled by passing it over the evaporator 37, as required.

The roof of the cab 40 is also pierced by a second pipe 46 which discharges into a chamber 47. In the "safe" position this chamber is closed off and the aspirated air escapes from the cab through the ordinary openings of the latter whilst still pressurizing the cab as required to isolate it from the surrounding air, which may be polluted. Under the "comfortable" operating conditions the trap 41 is open whereas the slats 33 are closed. The air inside the cab 40 is then recycled, passing through the pipe 46. Physical filtration is not necessary since the air is already filtered and, as a safety measure, is passed only through the chemical filter. It will be understood that this "comfortable" position must only be used in the absence of toxic products. It enables the tractor driver to benefit from the air conditioning without causing any obstruction of the filters. In the microprocessor version, the changeover from the "comfortable" to the "safe" position is automatic, since external "watch" is maintained by a detector.

Figure 5:
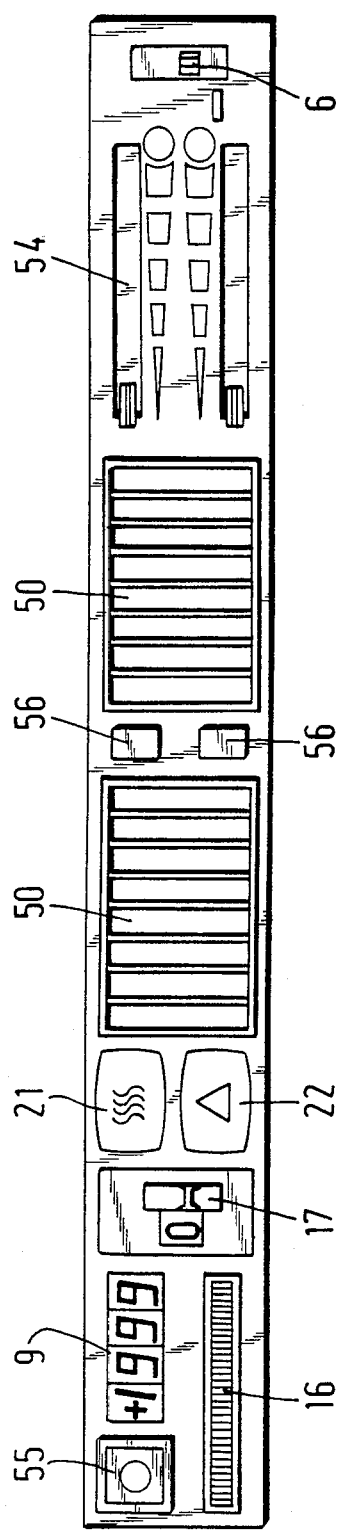
FIG. 5 is a view of the control panel of the device.

In accordance with one feature of the invention the filtered air does not reach the cab directly. Instead the pipe 39 is connected to a diffuser of generally square shape seen in perspective in FIG. 3. This diffuser 49 brings about a particular distribution of the air within the cab by means of a set of nozzles 50 distributed around the part of the diffuser above the head of the driver. The pressurization of the air within the diffuser 49 is sufficient for the air to emerge perpendicularly to the plane of the diffuser so as to constitute an air curtain at least at the level of the driver's face. The orifices 50*a* are intended to defrost the windscreen. The control panel of the device shown in more detail in FIG. 5 is in front of the driver's eyes. The enclosure is closed off at the top by a cover 47 held in place by snap-action or similar type fasteners 53 adapted to seal the cover by crushing gaskets 47*a* (see FIG. 2) and conferring ease of maintenance. In the rear, non-sealed part of the device, at least one opening 43 provides for the passage of cooling air needed to condense the freon in the condenser 45.

Figure 4:
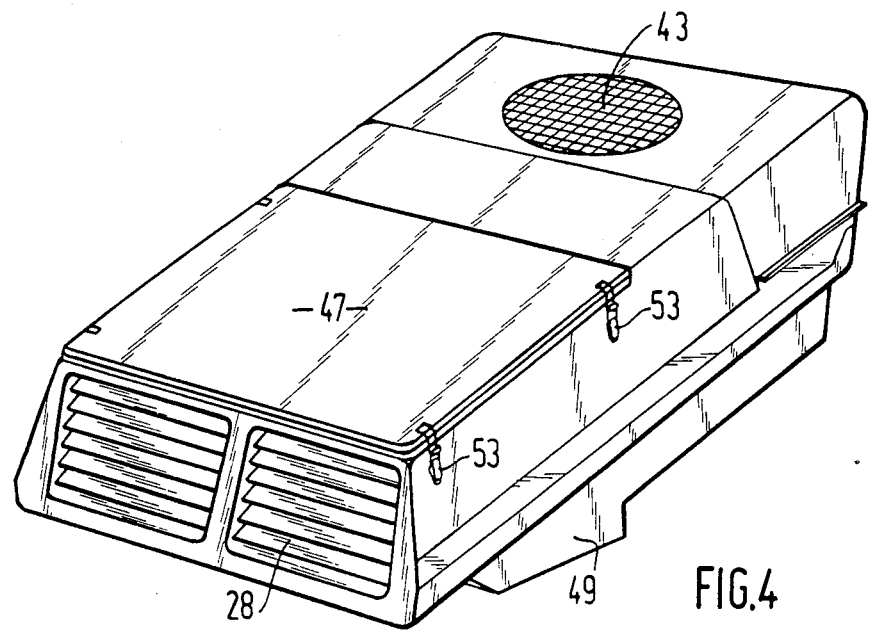
FIG. 4 is a perspective view of the enclosure.

FIG. 4 shows a device in accordance with the invention in perspective and in it can be seen the grille 48, possibly in two parts, the cover 47 and the opening 43, the diffuser 49 being inside the cab 40 after fitting.

Figure 3:
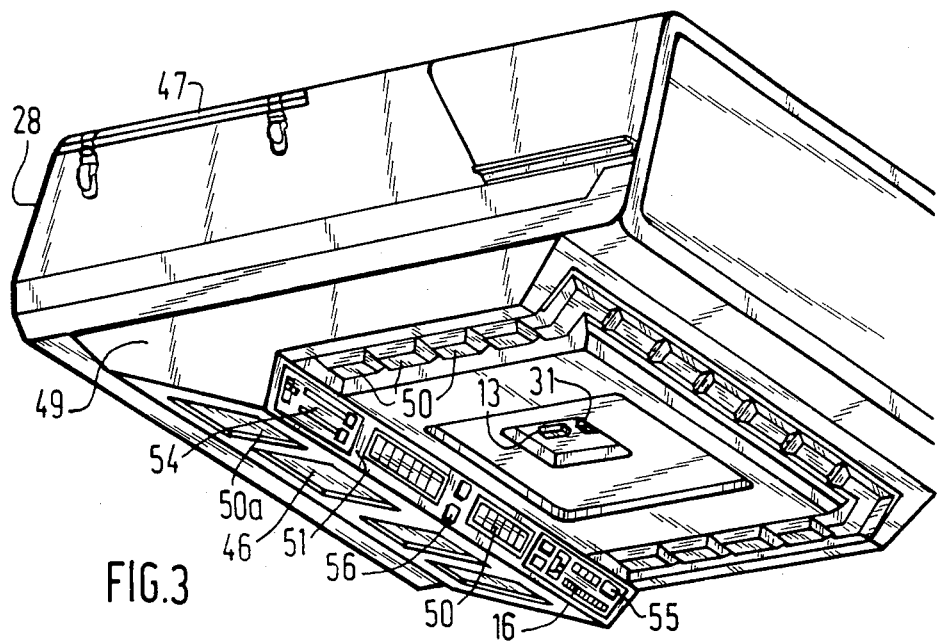
FIG. 3 is a perspective view of the air diffuser inside the cab.

FIG. 5 shows a control panel used to control the device in accordance with the invention. As shown in FIG. 3, this is incorporated into the diffuser 49. It incorporates items previously mentioned and, from left to right in the figure, the volumeter 9, the reading of which indicates when it is necessary to change the filter cells, the toxicity meter 16, the switch 17 which is set according to the nature of the product which is to be spread, the switches 21 and 22 controlling the changeover from the "comfortable" position to the "safe" position, the lamps 23 and 24 of FIG. 1 being, for example, incorporated into the switches, and on the extreme right the airflow speed selector 6. Also seen in a switch 55 for resetting the volumeter to zero after changing the cell and ventilation outlets 50. The controls 54 of the air conditioner are identical to those found on the majority of air conditioned vehicles. The reference numeral 56 designates the pressurization and toxicity alarm lamps.

The foregoing description mentions the existence of only one semiconductor toxicity detector. As previously indicated, a number of controls are provided for the driver who must play an active role in the protection function and, in particular, decide whether to use the "comfortable" operating conditions or the "safe" operating conditions, which are no less comfortable for all that. Generally speaking, it is advisable for the tractor driver to have to concern himself only with driving his machine. The operation of the device may be rendered entirely automatic. To this end, a second toxicity sensor is provided on the outside of the vehicle, the analysis result determining automatically whether the level of pollution is such that the "safe" operating conditions should be selected or if it is possible for the "comfortable" operating conditions to continue.

In this case, the amount of information which the device has to process is increased and a microprocessor is preferably employed, even though the necessary processing can be handled by conventional circuits. The use of a microprocessor also enables operational safety to be enhanced through the provision of a third semiconductor sensor immediately after the filter elements.

Figure 6:
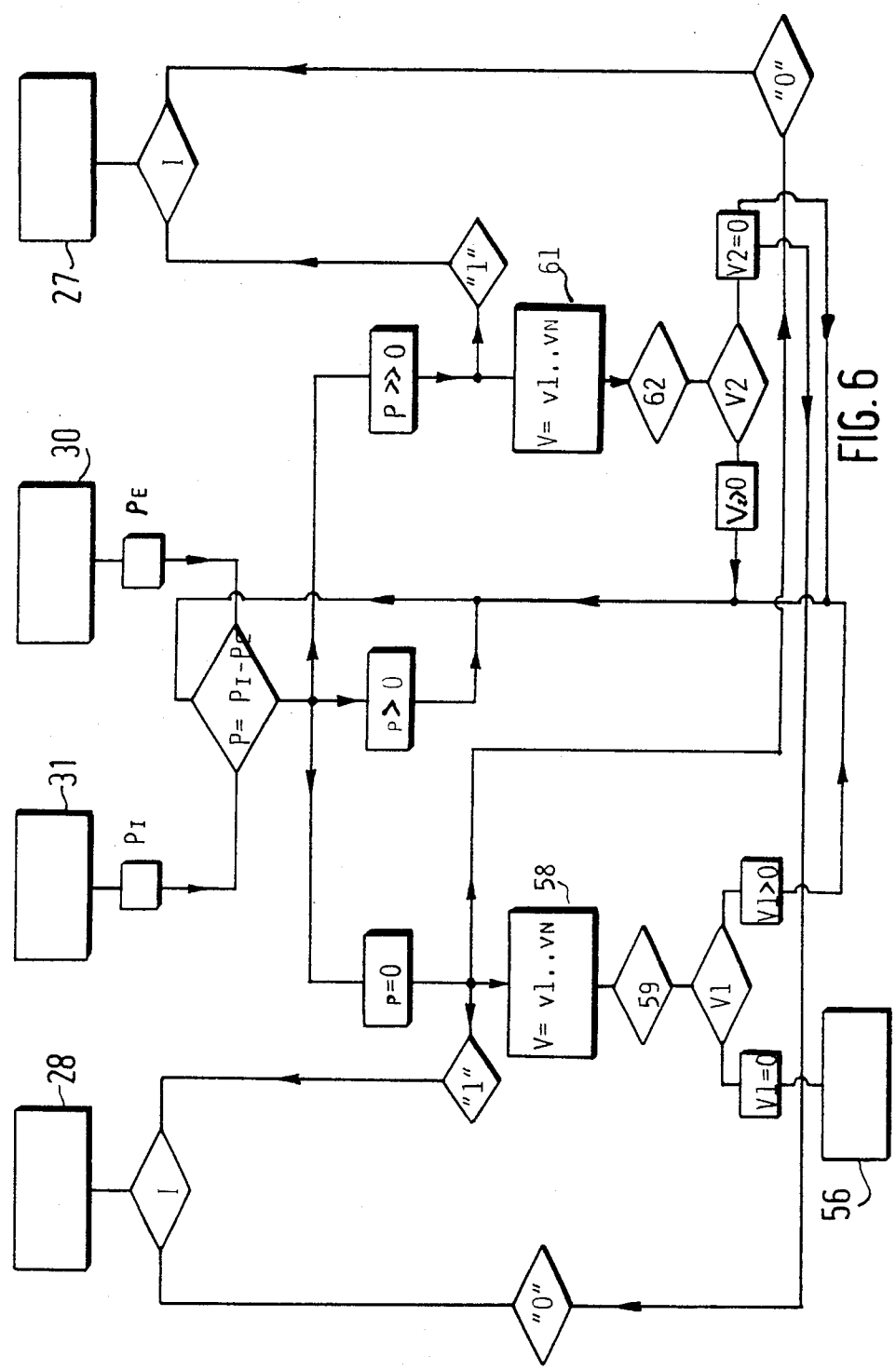
FIGS. 6 and 7 are flowcharts showing the control of the device in accordance with the invention by a microprocessor and respectively relating to pressure monitoring and toxicity monitoring.
Figure 7:
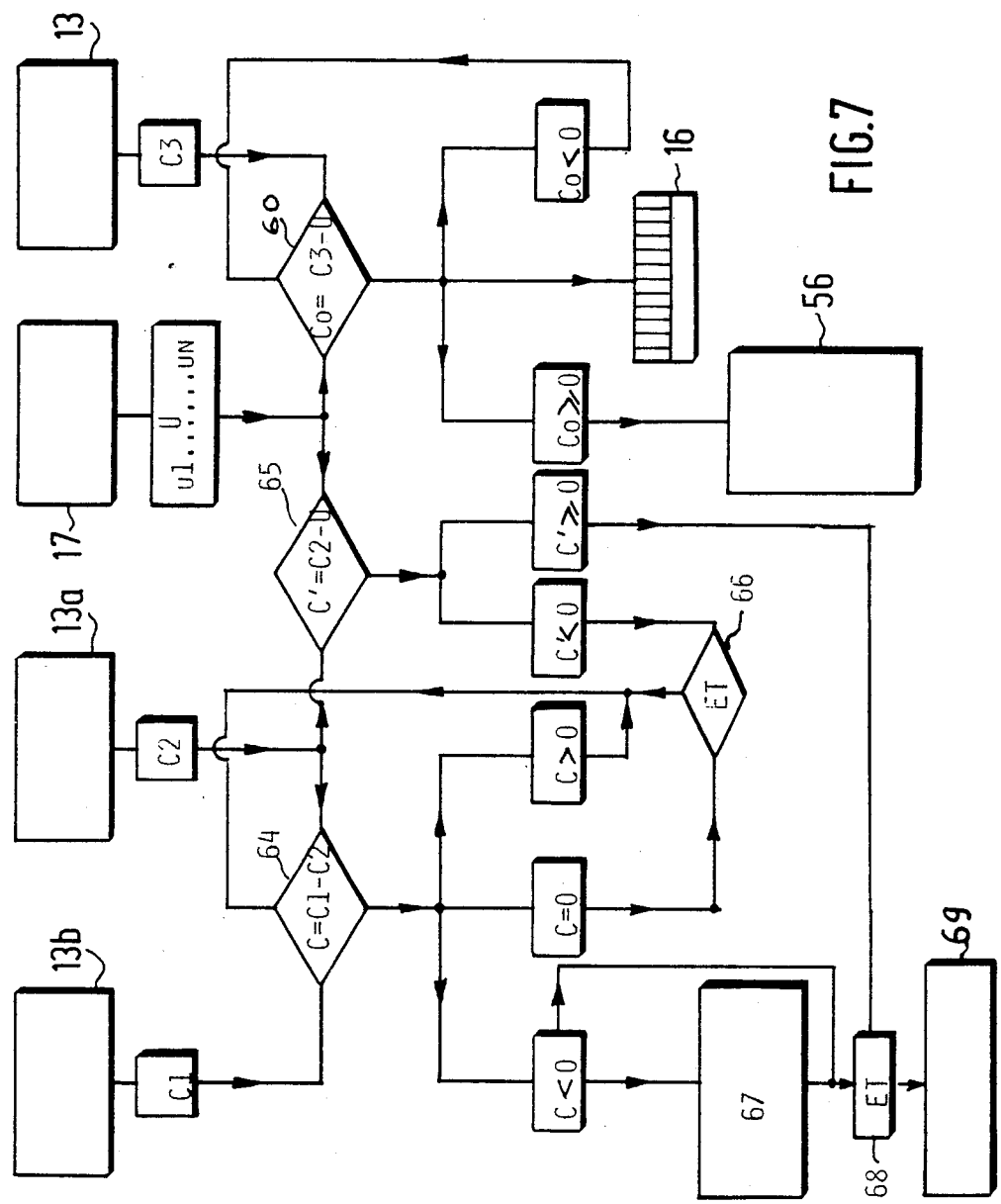

FIGS. 6 and 7 are pressurization and detection flowcharts, respectively, from which an electronic engineer can readily deduce an appropriate circuit according to the microprocessor available to him. FIG. 6 shows the internal pressure sensor 31 and the external pressure sensor 30. The two sensors 31 and 30 are connected to stages Pi and Pe each of which delivers a signal at a voltage which is proportional to the sensed pressure. These two stages are connected to a comparator 57 which delivers a voltage $P = Pi - Pe$. The output of the comparator 57 is connected to a discriminator which distinguishes between three situations:

1. P is greater than zero. There is an overpressure in the cab and the required result is achieved, no action on the slats is of benefit. The value of P is tested periodically.
2. If P is equal to zero, the pressurization slat control switch 28 goes to the "1" state and the recirculation flap control switch goes to the "0" state. In other words the slats 33 open and the trap 41 closes. Stage 58 initiates the changeover of the motor-driven fan 1 to the speed higher than that initially employed. After a time-delay two minutes set by stage 59, a signal V1 is emitted which is representative of the difference between the maximum speed and the actual speed. If the signal V1 is equal to "0", the lamp 56 or an alarm signal alters the driver. This is subject to a time-delay so as to effectively occur only when the new operating speed has been taken into account by the computation stage 57. If the signal V1 is positive, the airflow speed having increased, the pressure inside the cab increases and pressurization is assured.
3. If the signal P is significantly higher than zero, the recirculation trap switch 27 controlling the trap 41 goes from "0" to "1", in other words the trap opens. Conjointly, the signal "P" is applied to the input of a stage 61 controlling changeover of the motor-driven fan to the lower speed. After passing through a time-delay stage 62, a comparator 63 delivers a signal "V2" after two minutes. If this signal is null, that is to say if the lowest speed has been reached, the pressurization slats control switch 28 goes from the "1" state to the "0" state and these slats close. The air in the cab is then recycled. If the signal "V2" is positive it is returned to the stage 57 and during the next computation cycle the new speed is taken into account and it decreases until the minimum speed is achieved. Thus the speed of the motor-driven fan decreases progressively until the required equilibrium is achieved. Note that the two sets of operating conditions previously referred to no longer exist as such, rather it is the microprocessor which, according to the information which it receives, determines the positions of the slats 33 and trap 41 and the rotation speed of the motor-driven fan.

The starting up of the device initiates the sequence of operations which has just been described.

It will be understood that the microprocessor also deals with information relating to the levels of toxicity, according to the flowchart shown in FIG. 7. In the upper part of the figure are shown an external sensor 13b, a sensor 13a disposed beyond the filter group, the sensor 13 placed inside the cab and a range selector 17 which fulfils the same function as the switch 17 in FIG. 1.

The selector 17 outputs signals at voltages corresponding to respective products commonly used in agriculture. This selection is manual in principle, automatic selection requiring an analysis of the products. The farmer knows which product he is going to spread and the necessary information on toxicity is given on the packaging.

The sensor 13 emits a signal C3 which is compared with U in stage 60. The result of this comparison is a signal Co. The signal Co is applied to the toxicity meter 16. If Co is greater than or equal to zero, the signal triggers an alarm 56. On the other hand, if Co is negative, which is the normal situation, the signal is returned to stage 60 in order to carry out periodic tests. The toxicity meter 16 is not necessary but it enables the driver to continously monitor changes in toxicity inside the cab. This part of the flowchart is identical to the toxicity detection stage 12 in FIG. 1.

In the embodiment shown in this figure, a toxicity sensor 13b is disposed on the inlet side of the cell, that is outside the cab, and a second sensor 13a is disposed in the enclosure beyond the filter cell. The presence of a toxicity sensor 13b outside the cab provides for automatic initiation of pressurization as soon as the toxicity detected reaches a particular threshold defined by the range selector 17. To this end, the signal C1 sensed by 13b is compared with a preselected one of signals U1 . . . Un. If C1 is greater than Um, pressurization is automatically initiated and there is a changeover from the "comfortable" operating conditions to the "safe" operating conditions. This connection is not shown in the figure.

The presence of the sensor 13a beyond the cell may seem of no benefit given that the toxicity level is a priori the same beyond the filter cell 35, 34 and inside the cab. This is not so. An accident may occur within the cab, resulting, for example, from the opening of a door suddenly increasing the internal toxicity level, while the functioning of the filter cell remains correct. In hot weather, for example, ions attached to the windows may desorb in such as way that the interior atmosphere is modified. Finally, the cell itself may desorb under certain conditions. The device represented in flowchart form in FIG. 7 provides continuous information on the phenomenon in question, significantly enhancing safety.

The sensors 13b and 13a deliver the signals C1 and C2 representative of the toxicity detected outside the cab and beyond the filter cell, respectively. The difference C1-C2 is tested in stage 64 and a signal C is emitted at the output of stage 64. This signal represents the filtration capacity of the cell 34, 35. If C is greater than zero (normal operation) the signal is returned to stage 64 in order to proceed with the next test. Also, a comparator 65 computes a signal C' which is equal to C2-U, where U is the reference voltage selected as indicated hereinabove. This signal must normally be negative. If it is negative it is applied to the "AND" gate 66 which also receives the signal C, the simultaneous presence of the signals C and C' enabling the gate 66 which routes the output signal to stage 64. A null value of the signal C may signify either that there is no external pollution or that the filter is totally ineffective. The signal C' resolves this doubt. When the signal C is less than zero, it means that the pollution on the outlet side of the cell is higher than the external pollution. In all cases an alarm is initiated by stage 67 and indicates that the cell must be changed and the filter cleaned. If the signal C' is positive at the same time as this signal C is negative, this means that the filter cell is desorbing and polluting the atmosphere in the cab. In this case, the signals C and C' are applied to the inputs of an "AND" gate 68 which via stage 69 initiates a cell desorption alarm. Spreading must then be stopped immediately and the cell changed. The use of a microprocessor eliminates a multiplicity of relays.

The voltages U may correspond, for example, to phosphorus-based insecticides, herbicides, nitrate-based herbicides and fungicides.

With regard to the toxicity meter 16, it is preferably equipped with an accumulative counter. The lesions caused in the organism depend not only on the toxicity at a given time, as indicated by the toxicity meter, but on the accumulation of toxic products within the organism. A counter which is reset to zero every morning, for example, provides for computing the quantity of toxic products absorbed by the same driver during the working day, and for initiating an alarm where necessary.

It will be understood that various changes in the details, materials and arrangements of parts, which have been herein described and illustrated in order to explain the nature of the invention, may be made by those skilled in the art within the principle and scope of the invention as expressed in the appended claims.

I claim:

1. A device for protecting an operator within the cab of a mobile plant working in a polluted environment comprising an air treatment unit adapted to be incorporated into the cab accommodating said operator, said air treatment unit comprising an air inlet port, at least one coarse filter element, a fine filter element and a chemical filter element, the filter elements being in fluid communication with the inlet port, and a motor driven fan having a suction and a discharge, the suction being connected to receive filtered air from the filter elements, the fan discharge being adapted to discharge the filtered air into the cab;

an air recycling means between the cab and the air treatment unit, the recycling means comprising a recycling opening inter-communicating the cab and the air treatment unit, a trap intermediate the fine filter and the chemical filter, the trap being movable from an open position to permit recycled air from the cab to bypass the fine filter but not the chemical filter prior to entering the fan and a closed position wherein recycled air is prevented from passage;

a pressure monitoring device affixed to the cab to monitor the air pressure differential inside of and outside of the cab;

a toxicity monitoring system to monitor the toxicity of air inside of and outside of the cab, the toxicity monitoring system comprising a first toxicity sensor within the cab and a second toxicity sensor mounted exteriorly of the cab; and electrical circuit means operatively interconnecting the air recycling means, the pressure monitoring device and the toxicity monitoring system.

2. A device according to claim 1 wherein said air treatment unit further comprises a radiator adapted to be connected to a motor coolant circuit of said mobile plant and an air conditioner comprising an evaporator and a compressor adapted to be driven from a motor of said mobile plant, and wherein said air conditioner further comprises a condenser external to said air treatment unit and adapted to be mounted on said cab.

3. A device according to claim 2 wherein said air treatment unit comprises pivoted slats disposed in said air inlet port, a chamber disposed between said chemical filter element and said coarse and fine filter elements, means for controlling said pivoted slats and means for controlling said trap, whereby closing said pivoted slats establishes a closed loop air circulation path within said cab.

4. A device according to claim 3 further comprising a microprocessor connected to said sensors and adapted to process the information provided thereby.

5. A device according to claim 1, further comprising a switch adapted to select either "safe" operating conditions or "comfortable" operating conditions.

6. A device according to claim 5, wherein said switch is adapted to be manually operated.

7. A device according to claim 5, wherein said switch is adapted to be automatically operated.

8. A device for protecting the operator of mobile plant working in a polluted environment, comprising an air treatment unit adapted to be fitted or incorporated into a roof of a cab accommodating said operator, said air treatment unit containing an inlet port, at least one coarse filter element, a fine filter element, a chemical filter element and outlet port including a motor driven fan, a pressure monitoring device including a sensor exteriorily of the cab and a second sensor interior of the cab, a toxicity monitoring system comprising one semiconductor sensor within the cab, a second semiconductor sensor adapted to be disposed externally of said cab and a third semiconductor sensor adapted to be disposed behind the air treatment unit, and a display panel disposed inside the cab connected to said semiconductor sensors.

* * * * *